Patented Nov. 5, 1946

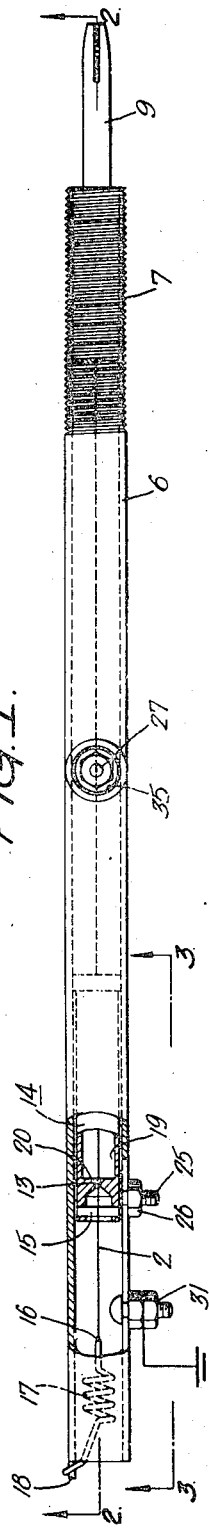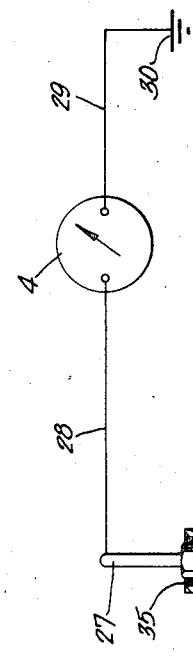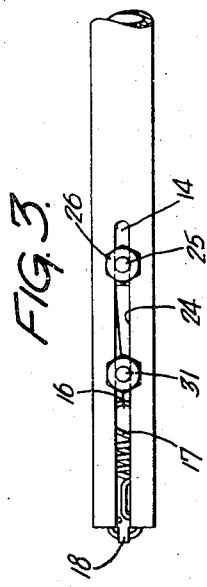

2,410,707

UNITED STATES PATENT OFFICE 2,410,707

DEVICE FOR MEASURING HIGH-FREQUENCY POWER

William E. Bradley, Swarthmore, and Nels Johnson, Penn Wynne, Pa., assignors, by mesne assignments, to Philco Corporation, Philadelphia, Pa., a corporation of Pennsylvania Application May 18, 1944, Serial No. 536,146

8 Claims. (Cl. 171—95)

This invention relates to instruments for measuring electric power at ultra high frequencies and is directed more particularly to the provision of a stable and reliable instrument of that character which is especially well adapted to measurement of what may conveniently be called intermediate power values—by which is meant wattages ranging from say ten milliwatts up to something like two watts. We do not intend to imply, however, that our herein-described instrument is useful only within the power range above indicated, but merely that it meets a need within that range of wattages which, so far as we are aware, is not as well met by any prior art ultra high frequency power measuring device.

Another object is to provide a power measuring device of the kind referred to which is small and readily portable.

Still another object is to provide an ultra high frequency power measuring device which is satisfactorily accurate.

The subject of the present application is an outgrowth of the invention described and claimed in our co-pending application Serial No. 533,226, filed April 28, 1944. In that application there is disclosed a microwave frequency power meter comprising a non-resonant co-axial line whereof the axial conductor consists of an elongate small diameter resistance wire and in which a thermocouple junction is disposed at the input end of the resistance wire and is subjected to heat generated in the resistance wire—the thermocouple being arranged to actuate a meter proportionately to the power of the input U. H. F. wave.

The device of the present invention is distinguished from that of our aforementioned prior application and is characterized in that the co-axial line is resonant and preferably tunable throughout a prescribed frequency band.

From the fact of resonance it follows that there is engendered in the co-axial line a standing wave with incidental current nodes and antinodes; and by placing a thermocouple hot junction at a current antinode we are able to realize a much greater temperature change at said junction and, concomitantly, a much greater meter deflection per unit of power input change than can be achieved with a non-resonant line such as we employ in our prior device.

In the drawing:

Fig. 1 is an elevational view of a power meter in accordance with a preferred embodiment of the invention;

Fig. 2 is a longitudinal sectional view taken on line 2—2 of Fig. 1;

Fig. 3 is a fragmentary elevation viewed from line 3—3 of Fig. 1; and

Fig. 4 is a cross-sectional view taken on line 4—4 of Fig. 2.

Before undertaking to describe in detail the instrument shown in the drawing, it is thought best to point out some of the major essentialities and explain in a general way its mode of operation. First of all, let it be noted that the dot identified by reference numeral 1 represents a hot thermocouple junction formed between a fine wire 2, preferably of constantan, and a second fine wire 3, preferably of copper. The objective is to raise the temperature of thermocouple junction 1 proportionately to the magnitude of the U. H. F. power dissipated by the instrument and to translate the temperature rise into a D. C. voltage which is impressed upon the meter 4—the latter being usually a low resistance millivoltmeter designed to respond to voltages of the magnitude expected to be generated by the thermocouple.

The right hand end of the instrument, as viewed in Figs. 1 and 2, constitutes the input end. Reference numeral 5 designates, generally, a resonant co-axial line which is tunable precisely to the frequency of the incoming wave—the line being tunable over some predetermined wave band such, for instance, as 9.5–10.5 centimeters. The purpose is to generate within the resonant line 5 a standing wave having a current antinode at thermocouple junction 1. That is to say, it is the intention to cause the maximum possible current to flow along wire 2 through thermocouple junction 1 so that the temperature rise thereat will be as large as it is possible to achieve with a given amount of input power at the frequency to which the line is tuned. We are able in this way to build up at the thermocouple hot junction $I^2R$ values which are nearly twice as great as could be achieved in an untuned line with the same amount of power.

Co-axial line 5 comprises an outer tubular conductor 6 threaded externally at 7 to engage a coupling, not shown, by means of which the instrument may be connected to an ultra high frequency source. Usually the instrument is connected to one end of a standard co-axial line, as for example, a fifty ohm line or a seventy ohm line. Since line 5 usually has an input impedance different from the internal impedance of the source to which the instrument is to be conducted, it ordinarily is equipped with a matching transformer 8. Such a transformer will enable direct connection to a source having some definite predetermined internal impedance; and if it is necessary to effect connection with a source having some other internal impedance a match can be achieved by interpolating a second transformer between the source and transformer 8.

Beginning at the right hand end the axial conductor comprises first a terminal member 9 designed to engage the complementary contact member of a fitting, not shown, on the end of the co-axial feed line. Next in order is a conductor portion 10 which forms the axial conductor of the matching transformer 8. This transformer, it will be noted has a length equal to a quarter-wave-length in polystyrene—the bushing 11 being preferably of polystyrene. Of course, if an alternative dielectric material is employed the length of the transformer should be altered accordingly. It is to be understood that transformer 8 should have a characteristic impedance equal to the geometric mean between the characteristic impedance of the feed line and the input impedance of the resonant line to the left of the transformer.

Constantan wire 2 is attached at point 12 to the left hand end of conductor 10 and extends axially along line 5 and through a small center aperture 13 in a tuning plug 14 which presently will be described. Wire 2 then passes along one side of an offset pin 15 carried by tuning plug 14 and is attached at 16 to one end of a coil spring 17 which is anchored on a lug 18 forming an integral part of outer conductor 6. Spring 17 holds wire 2 under tension and, by virtue of pin 15, pulls said wire laterally into firm contact with one side of aperture 13.

Tuning plug 14 is adjustably movable lengthwise along the interior of tubular outer conductor 6 and the purpose of so doing is to tune the resonant line to the frequency of the incoming wave. Plug 14 has a bore 19 which is terminated by a transverse surface 20. The distance between this surface and the point 12 should be an integral multiple of a half-wave-length at the frequency of the received wave. In this particular case the distance referred to has been made equal to two half-wave-lengths. Because of the fact that transverse surface 20 is located at a current antinode, it is desirable, in order to avoid arcing troubles, to so design plug 14 that contact between it and the inner surface of tubular conductor 6 is made at a point one quarter-wave-length in advance of surface 20; that is to say along the circumference identified by reference numeral 21. Plug 14 is accordingly designed to extend forwardly, as shown, and to terminate in an external flange 22 designed to effect good contact with the bore of tubular conductor 6. In order to further ensure good contact along circumference 21, plug 14 is provided with a number of longitudinal slits 23 (see Fig. 4) extending for some distance from the right hand end. The external diameter of flange 22 should be made somewhat larger than the bore into which it fits so that when contracted to fit said bore a good contact will result.

Inasmuch as there is theoretically no current flow between outer conductor 6 and flange 22 when plug 14 is adjusted to its proper position it may be asked why a good contact is needed along circumference 21. The answer is that circumference 21 is located at a current node only when the tuning plug has been adjusted to the point where the distance between surface 20 and point 12 is precisely equal to a wave length. During the time that the plug is being moved to effect such an adjustment there is current flow to and from plug 14 at circumference 21 and if the contact were not good the indicator of meter 4 would fluctuate erratically and thus introduce some difficulty in the matter of determining the point at which the instrument is accurately tuned to the frequency of the incoming wave. In addition, the length along plug 14 from surface 20 to its right hand end is exactly equal to a quarter-wave-length only at one frequency and differs therefrom considerably at each end of the operating band.

Tubular outer-conductor 6 is provided at its left hand end (see Fig. 3) with a longitudinal slot 24 through which extends a threaded stud 25 which is attached at its inner end to plug 14. Stud 25 is provided with a locking nut 26 which serves to secure plug 14 in any position to which it may be adjusted. Upon loosening nut 26 the tuning plug can be moved axis-wise along wire 2, thus altering the distance from surface 20 to point 12 to conform to the wave length of the incoming wave. With a fixed matching transformer it is not practicable to move tuning plug 14 a very great distance because to do so would result in so much of a mismatch that the meter readings would cease to be sufficiently accurate. Moreover, too great a movement of plug 14 would cause the dimension from surface 20 to junction 1 to depart excessively from a half-wave-length, which would result in removing junction 1 too far from the center of the current antinode. This could, of course, be offset by making allowance for the deviation in calibrating meter 4, but ordinarily it is not necessary to design the instrument to cover a band of such width as would give rise to errors of important magnitude. In an actual case the total permissible movement of plug 14 was determined to be one centimeter. In that particular case the wave band extended from 9.5 to 10.5 centimeters. This provided a tuning band equal to about 10% of the center frequency and involved a calculated error of about 1%.

The direct current circuit for meter 4 includes thermocouple hot junction 1, copper wire 3, terminal conductor 27, conductor 28 and conductor 29, which is shown grounded at 30. Outer tubular conductor 6 is also grounded through binding post 31. Alternatively, conductor 29, may be connected directly to binding post 31. That portion of wire 2 which is to the left of junction 1 is also included in the direct current circuit.

It is necessary to confine the radio frequency energy within the resonant co-axial line and to exclude the same from meter 4 and that part of the direct current circuit which is outside the resonant line. To that end wire 3 is brought out from junction 1 through a filter stub 32. This comprises an outer tubular conductor 33, preferably of the same diameter as tubular conductor 6, and an inner cup-like conductive member 34 which is insulated from outer conductor 33 by means of a layer of insulation 35—preferably polystyrene. The upper interior end of cup-like member 34 is positioned a quarter-wave-length (in air) from junction 1. This causes the filter stub, when viewed from junction 1, to look like an open circuit or high impedance. But it is necessary to insulate member 34 from outer conductor 33 in order to prevent short circuiting the D. C. current and that is the reason for the insulation 35. It is necessary to prevent leakage of high frequency wave energy through the space surrounding member 34 and occupied by insulation 35. For that purpose member 34 is made of a length equal to a quarter-wave-length in polystyrene. By so doing the gap at 36 is caused to look like a short circuit. Obviously, all dimensions in terms of wave-length units and fractions of wave-lengths can be rigorous only at one specific frequency—which should be the center frequency from which the device is tunable an equal amount in either direction.

As previously indicated it is necessary to design transformer 8 to effect an impedance match between the resonant line 5 and the co-axial feed line, not shown. The ordinary procedure in matching co-axial lines having different characteristic impedances is to use a coupling section or transformer one quarter-wave-length long and having a characteristic impedance equal to the geometric mean of the characteristic impedances to be coupled. Where, however, the co-axial line at the output end of the transformer is short circuited, as in the present case, it is not permissible to use the characteristic impedance of said line in computing the required characteristic impedance of the coupling transformer. Instead, we must use what is termed the input impedance of line 5 as distinguished from its characteristic impedance. However, we must first determine the characteristic impedance of line 5 in order to compute the input impedance.

The characteristic impedance of line 5 may be computed from the formula $$Z_0 = 138 \log_{10} \frac{b}{a} \quad (1)$$

where $Z_0$ = characteristic impedance
$b$ = inside diameter of conductor 6
$a$ = diameter of wire 2

Having determined the characteristic impedance of line 5 we may then determine its input impedance $Z_1$ from the formula $$Z_1 = Z_0 \left( \frac{1 - e^{-p a \lambda}}{1 + e^{-p a \lambda}} \right) \quad (2)$$

where $e$ = base of natural logarithms
$p$ = length of resonant line in half-wave-length units—which must be an integral number.
$\alpha$ = attenuation constant of the resonant line in nepers per centimeter = $R/2Z_0$, where R is the resistance per unit length of the inner conductor in ohms per centimeter at the received micro-wave frequency
$\lambda$ = wave length in centimeters Having determined the input impedance of $Z_1$ of line 5 from the above formula, the characteristic impedance of transformer 8 can be computed from the formula $$Z_2 = \sqrt{Z_1 Z_3} \quad (3)$$

where $Z_2$ is the characteristic impedance of the transformer
$Z_3$ is the characteristic impedance of the feed line In relating the procedure for calibration of the herein-described instrument the following symbols will be employed:

$T$ = temperature rise in deg. cent. of junction 1 for a given input wattage
$T_0$ = asymptotic temperature rise of wire in deg. cent. computed from Formula 4 infra.
$T_{rf}$ = temperature rise at thermocouple junction 1 for any given amount of microwave power input.
$T_L$ = temperature rise at thermocouple junction 1 for same amount of low frequency power input.
$W$ = wattage employed in determining value of T, per second step, infra. This is an arbitrarily selected value, such as one watt.
$d_1$ = diameter of wire 2, in cms.
$d_2$ = diameter of wire 3, in cms.
$\sigma_1$ = thermal conductivity of wire 2 which, for constantan = 0.26 joule/sec. cm. per deg. cent.
$\sigma_2$ = thermal conductivity of wire 3 which, for copper = 3.8 joules/sec. cm. per deg. cent.
$\lambda$ = wave length in centimeters The first step in the calibration is to impress upon the instrument a series of 60 cycle voltages and record the meter scale readings corresponding to known input wattages. The latter are simply the values of $I^2R$, where R is substantially equal to the resistance of wire 5 between surface 20 and point 12.

The second step consists in determining at a given input power W, say 1 watt, the temperature (T) above room temperature at thermocouple junction 1. This can be ascertained from tables such as will be found in a publication of the American Institute of Physics entitled "Temperature—Its Measurement and Control."

The third step is to determine the value of $T_0$ from the formula $$T_0 = T \left[ 1 + \frac{1}{2} \sqrt{\frac{\sigma_2}{\sigma_1}} \left( \frac{d_2}{d_1} \right)^{3/4} \right] \quad (4)$$

The fourth step is to compute the ratio $$\frac{T_{rf}}{T_L}$$

from the formula $$\frac{T_{rf}}{T_L} = 1 + \frac{1}{1 + \frac{4\pi^3 d_1^2 \sigma_1 T_0}{\lambda W}} \quad (5)$$

The high frequency power value for any meter scale reading is then determined by multiplying the corresponding low frequency power value by the ratio $$\frac{T_{rf}}{T_L}$$

It is found from computations based upon the foregoing formulae that when wires 2 and 3 are each of .003" diameter and the wave length is 10 centimeters the value of $$\frac{T_{rf}}{T_L}$$

is approximately 1.90.

From the foregoing description, it will be seen that the invention has provided an improved device for the measurement of electric power at ultra high frequencies. It will be understood, of course, that the invention is not limited to the specific disclosure but only by the scope of the appended claims.

We claim:

1. In a high frequency electric power measuring device, a co-axial resonant line having an input end, said line being equal in length to an integral multiple of a half-wave-length, where the wave length is that of the wave whose power is to be measured, said line comprising a tubular outer conductor and an axial conductor consisting of a small diameter high resistance wire, a hot thermocouple junction disposed within said resonant line in intimate heat transfer relation to said axial conductor and located at a current antinode situated substantially an integral number of half-wave-lengths from the nearest end of said line, and a direct current circuit including said junction together with a meter responsive to the D. C. voltage generated by said junction.

2. In a high frequency electric power measuring device, a co-axial resonant line having an input end, said line being at least approximately equal in length to an integral multiple of a half-wave-length, where the wave-length is that of the wave whose power is to be measured, said line being short-circuited at the end remote from said input end, said line comprising a tubular outer conductor and an axial conductor consisting of a small diameter high resistance wire, a hot thermocouple junction disposed within said resonant line in intimate heat transfer relation to said axial conductor and located at a current antinode situated substantially an integral number of half-wave-lengths from the nearest end of said line, and a direct current circuit including said junction together with a meter responsive to D. C. voltage generated by said junction.

3. In a high frequency electric power measuring device, a co-axial resonant line having an input end, said resonant line comprising a tubular outer conductor and an axial conductor consisting of a small diameter high resistance wire, a tuning plug disposed within said tubular outer conductor and adjustably movable therein lengthwise of said line, said plug forming a short-circuited termination for said resonant line at a point which, when the device is tuned to a specific wave-length, is substantially an integral number of half-wave-lengths removed from said input end, a hot thermocouple junction disposed within said resonant line immediately adjacent said axial conductor at a current antinode located at an intermediate point between the termini of the resonant line, said intermediate point being substantially an integral number of half-wave-lengths from the nearest end of said line, and a direct current circuit including said junction together with a meter responsive to D. C. voltage generated by said junction.

4. In a high frequency electric power measuring device, a co-axial resonant line having an input end, said resonant line comprising a tubular outer conductor and an axial conductor consisting of a small diameter resistance wire, a tuning plug disposed within said tubular outer conductor and adjustably movable therein lengthwise of said line, said plug having an axial aperture through which said resistance wire passes, said plug forming a short-circuited termination for said resonant line at a point which, when the device is tuned to a specific wave-length, is substantially an integral number of half-wave-lengths removed from said input end, a second wire joined to said resistance wire to form therewith a hot thermocouple junction at a current antinode situated substantially an integral number of half-wave-lengths from the nearest end of said line, and a direct current circuit including said junction and said second wire together with a meter responsive to D. C. voltage generated by said junction.

5. A device according to claim 4 having a quarter-wave filter stub connected to the outer tubular conductor and through which said second wire emerges from the resonant line, said filter stub being operative to isolate the meter from the high frequency wave within the resonant line.

6. A device according to claim 4 wherein the plug contacts the interior surface of the outer tubular conductor along a circumference which is approximately a quarter-wave-length distant from the short-circuited termination of the resonant line and to that extent nearer the input end than is said short-circuited termination.

7. A device according to claim 4 wherein the tuning plug is bored axiswise from its input end to a depth equal substantially to a quarter-wave-length at the center frequency of the device, said plug contacting circumferentially the interior surface of the tubular outer conductor at the input end of the plug.

8. In a high frequency electric power measuring device, a co-axial line having a resonant portion terminating at its input end in an impedance-matching transformer, said resonant portion including a tubular outer conductor and an axial conductor consisting of a small diameter resistance wire, a tuning plug disposed within said tubular outer conductor and adjustably movable axiswise therein, said plug being bored axiswise at the end thereof nearest the input end of said resonant portion and to a depth approximately equal to a quarter-wave-length at the center frequency of the device, said plug having an axial aperture through which said resistance wire passes, the bottom of the bore of said plug being defined by a transverse wall which forms a short-circuited termination of said resonant portion, said transverse wall being situated, when the device is tuned to a specific wave-length, an integral number of half-wave-lengths distant from said input end of said resonant portion, a second wire joined to said resistance wire at an intermediate current antinode to form a thermocouple hot junction, and a direct current circuit including said junction and said second wire together with a meter responsive to D. C. voltage generated by said junction.

WILLIAM E. BRADLEY.
NELS JOHNSON.